(12) United States Patent
Lederer et al.

(10) Patent No.: US 8,775,542 B2
(45) Date of Patent: Jul. 8, 2014

(54) DEVICE AND METHOD FOR USER-BASED PROCESSING OF ELECTRONIC MESSAGE COMPRISING FILE ATTACHMENTS

(75) Inventors: Thomas Lederer, Herrsching (DE); Jürgen Totzke, Poing (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 2236 days.

(21) Appl. No.: 10/563,489

(22) PCT Filed: Jun. 7, 2004

(86) PCT No.: PCT/EP2004/051042
§ 371 (c)(1),
(2), (4) Date: Jan. 3, 2006

(87) PCT Pub. No.: WO2005/004012
PCT Pub. Date: Jan. 13, 2005

(65) Prior Publication Data
US 2006/0195526 A1    Aug. 31, 2006

(30) Foreign Application Priority Data
Jul. 4, 2003   (DE) .................................. 103 30 282

(51) Int. Cl.
*G06F 15/16* (2006.01)
(52) U.S. Cl.
USPC .......................................... 709/207; 709/206
(58) Field of Classification Search
USPC ......................... 705/14; 707/10; 709/203–224
See application file for complete search history.

(56) References Cited

U.S. PATENT DOCUMENTS

| | | | |
|---|---|---|---|
| 6,687,741 B1 * | 2/2004 | Ramaley et al. | 709/206 |
| 6,820,111 B1 * | 11/2004 | Rubin et al. | 709/203 |
| 6,898,622 B1 * | 5/2005 | Malik | 709/206 |
| 7,003,551 B2 * | 2/2006 | Malik | 709/206 |
| 7,054,905 B1 * | 5/2006 | Hanna et al. | 709/206 |
| 7,113,948 B2 * | 9/2006 | Jhingan et al. | 707/10 |
| 7,194,514 B1 * | 3/2007 | Yen et al. | 709/206 |
| 7,232,949 B2 * | 6/2007 | Hruska et al. | 84/610 |
| 7,606,865 B2 * | 10/2009 | Kumar et al. | 709/206 |
| 8,051,131 B2 * | 11/2011 | Parry et al. | 709/206 |
| 2001/0054073 A1 * | 12/2001 | Ruppert et al. | 709/206 |

(Continued)

FOREIGN PATENT DOCUMENTS

| | | |
|---|---|---|
| DE | 103 46 897 | 8/2004 |
| JP | 2001344178 A | 12/2001 |
| WO | WO 02/48900 A2 | 6/2002 |

OTHER PUBLICATIONS

Microsoft Windows, Wikipedia, pp. 1-10.*

(Continued)

*Primary Examiner* — Backhean Tiv
(74) *Attorney, Agent, or Firm* — Buchanan Ingersoll & Rooney PC

(57) ABSTRACT

A method for the user-based processing of electronic messages comprising file attachments is provided. According to the method, a file attachment of an electronic message is replaced by a memory location link to a selected memory location in a user file system and the file attachment of the electronic message is saved in the selected memory location of the user file system. This permits the memory capacity that is required for storing data attachments to be significantly reduced in a user-friendly system.

20 Claims, 5 Drawing Sheets

(56) References Cited

U.S. PATENT DOCUMENTS

| | | | |
|---|---|---|---|
| 2002/0013817 A1* | 1/2002 | Collins et al. | 709/206 |
| 2002/0026818 A1* | 3/2002 | Bagusche | 72/110 |
| 2002/0059384 A1* | 5/2002 | Kaars | 709/206 |
| 2002/0091570 A1* | 7/2002 | Sakagawa | 705/14 |
| 2003/0055907 A1* | 3/2003 | Stiers | 709/206 |
| 2003/0115273 A1 | 6/2003 | Delia et al. | |
| 2003/0131062 A1* | 7/2003 | Miyashita | 709/206 |
| 2004/0073616 A1* | 4/2004 | Fellenstein et al. | 709/206 |
| 2004/0158607 A1* | 8/2004 | Coppinger et al. | 709/206 |
| 2005/0076111 A1* | 4/2005 | Cherkasova et al. | 709/224 |
| 2006/0155808 A1* | 7/2006 | Irlam et al. | 709/203 |

OTHER PUBLICATIONS

Microsoft Windows XP, Wikipedia, pp. 1-17.*

Microsoft Outlook 2002 and Windows XP, pp. 1-7.*

Microsoft Outlook, Wikipedia, pp. 1-5.*

Step by Step Tutorials for Microsoft Outlook 2002 Accessbility Options, Microsoft Corporation, pp. 1-65.*

Attachment Executive Version 3.0, 'Online', Jul. 2001, Retrieved from Internet: URL:http://web.archive.org/web/20030301033209/madsolutions.com/documentation.htm>, retrieved on Sep. 15, 2004, pp. 1-39, XP002296525.

"AOL 7.0 ab sofort in den USA erhältlich"; [retrieved from internet at] http://web.archive.org/web/*/http://www.golem.de/0110/16374.html; [retrieved on] Mar. 14, 2006; pp. 1-2.

Attachment Executive, Version 3.0, Jul. 2001, pp. 1-39, XP-002296525, MADSolutions, Ontario, Canada.

* cited by examiner

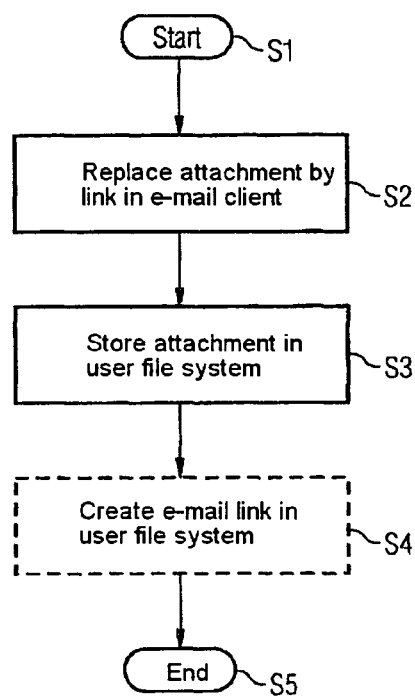

DEVICE AND METHOD FOR USER-BASED PROCESSING OF ELECTRONIC MESSAGE COMPRISING FILE ATTACHMENTS

CROSS REFERENCE TO RELATED APPLICATIONS

This application is the U.S. National Stage of International Application No. PCT/EP2004/051042, filed Jun. 7, 2004 and claims the benefit thereof. The International Application claims the benefits of German application No. 10330282.4 DE filed Jul. 4, 2003, both of the applications are incorporated by reference herein in their entirety.

FIELD OF INVENTION

The present invention relates to a device and method for the user-based processing of electronic messages with file attachments and particularly to a device and method for replacing file attachments in a user-based e-mail.

BACKGROUND OF INVENTION

Electronic messages or e-mails have become an increasingly accepted form of communication in modern telecommunications networks in both the business sphere and the personal sphere.

FIG. 1 is a simplified block diagram of a conventional telecommunications network of this kind for sending electronic messages, N being a network such as the internet, for example. Conventionally connected to this network N is a plurality of telecommunications terminals E1 to E3 in the form of, for example, personal computers (PCs), which conventionally have what is called an "e-mail client" as a transmitter and receiver of electronic messages. Known SMTP (Simple Mail Transport Protocol) e-mail clients are, for example, Lotus Notes™, Microsoft Outlook™ and so on, and they are stored locally as what are called "application programs" in the telecommunications terminals E1 to E3.

A user or one of the telecommunications terminal E1 to E3 has, as a rule, what is called an "e-mail box" or "mailbox" on a central server S. That is where all incoming and outgoing electronic messages or e-mails are temporarily stored and forwarded to appropriate further messaging servers (mail servers) (not shown) in the network N. When electronic messages or e-mails are received from this mail server S, conventionally all temporarily stored electronic messages are also filed on the local telecommunications terminals E1 to E3 or their associated local e-mail clients. The size of the central mailbox or central messaging box available to the user is normally limited. So if a user receives extensive file attachments to a particular e-mail or electronic message, these are filed both in the central mailbox and in the local e-mail client of the telecommunications terminal E1 to E3.

To enable particular data to be otherwise accessed, each user will store the file attachments of a particular electronic message or e-mail again in his user file system, to which he conventionally has personal access rights. As a result, however, the file attachment is now stored twice or three times, being filed both in the central mailbox, in the local mailbox or the e-mail client, and in the user file system. This results in higher costs owing to the increased memory required. If, on the other hand, the user removes the file attachments from the electronic message, vital information is lost, for example the location where the attachments have been stored, or the relationship between the explanatory text of the electronic message and the file attachment.

SUMMARY OF INVENTION

An object of the invention is therefore to provide, for the user-based processing of electronic messages with file attachments, a device and method enabling a reduced memory capacity requirement to be achieved.

According to the invention, this object is achieved in the features in the independent claims.

The file attachments of the electronic message are preferably replaced by a memory location link to a user-selected memory location in a user file system and are saved at a user-selected memory location in the user file system. As a result, the file attachment has to be saved only once in its full size, and memory capacity can thus be reduced.

At the user-selected memory location in the user file system a message link can also be created or saved as a cross-reference to the modified electronic message. This also provides a backlink to the original e-mail or electronic message for each stored file attachment. Handling of the file attachments filed in the user file system is thereby substantially improved.

Although the same file name is preferably used when saving the file attachments, alternatively the file name can be amended or modified when saving. In the same way, the backlinks or message links can also have automatically amended file names of the file attachments. In this way, a user has maximum flexibility when filing file attachments.

The file attachments can, moreover, be saved according to user-defined rules or in a user-set file structure. This results in further simplification and adaptation to a user's personal needs.

With regard to the device for the user-based processing of electronic messages, preferably an e-mail client is used for sending/receiving electronic messages with file attachments, an attachment substitution unit is used for replacing the file attachments by a memory location link, a user file system is used for storing the file attachments, an attachments insertion unit is used for inserting the replaced file attachments at a selected memory location in the user file system, and a control unit is used for controlling the relevant components. In this way, relatively minor modifications in a telecommunications terminal such as a PC can lead to an appropriately user-friendly and memory-optimized filing system for file attachments.

Further advantageous developments of the invention are characterized in the further dependent claims.

BRIEF DESCRIPTION OF THE DRAWINGS

The invention is described in more detail below on the basis of an exemplary embodiment and with reference to the drawing, in which:

FIG. 5 is a flowchart to illustrate essential method steps when the method according to the invention for the user-based processing of electronic messages is carried out.

DETAILED DESCRIPTION OF INVENTION

FIGS. 2A to 2D show simplified screen shots of an e-mail client, to illustrate essential method steps of the method according to the invention for the user-based processing of electronic messages.

According to FIGS. 2A to 2D, Microsoft's Outlook™ program, for example, is used as the SMTP e-mail client or as the program for processing the electronic messages, as installed in telecommunications terminals for example.

Other e-mail programs or e-mail clients can, of course, be used in the same way.

Figure 1:
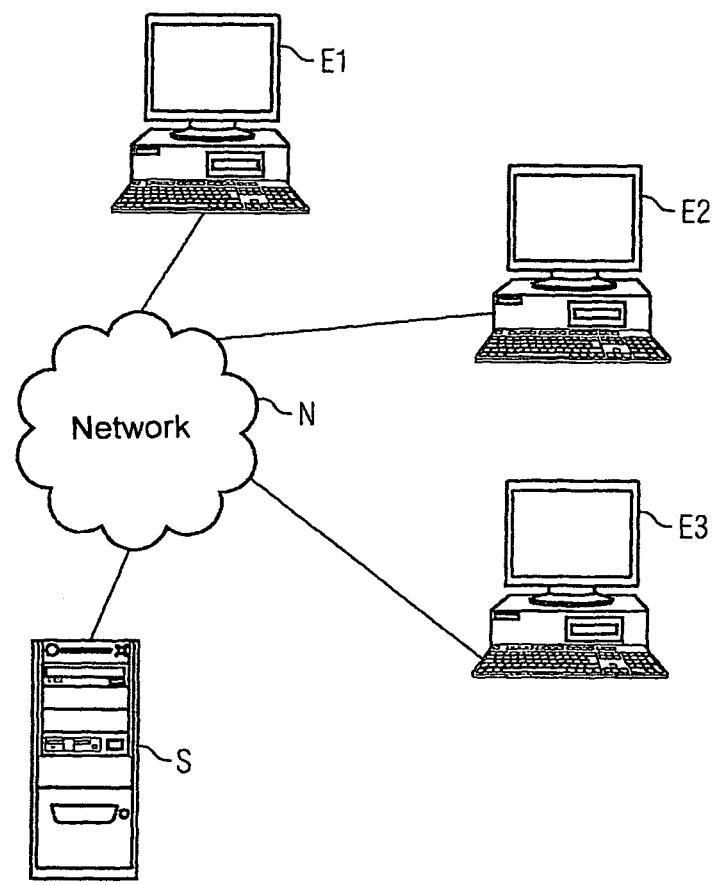
FIG. 1 is a simplified block diagram of a conventional telecommunications network.
Figure 2A:
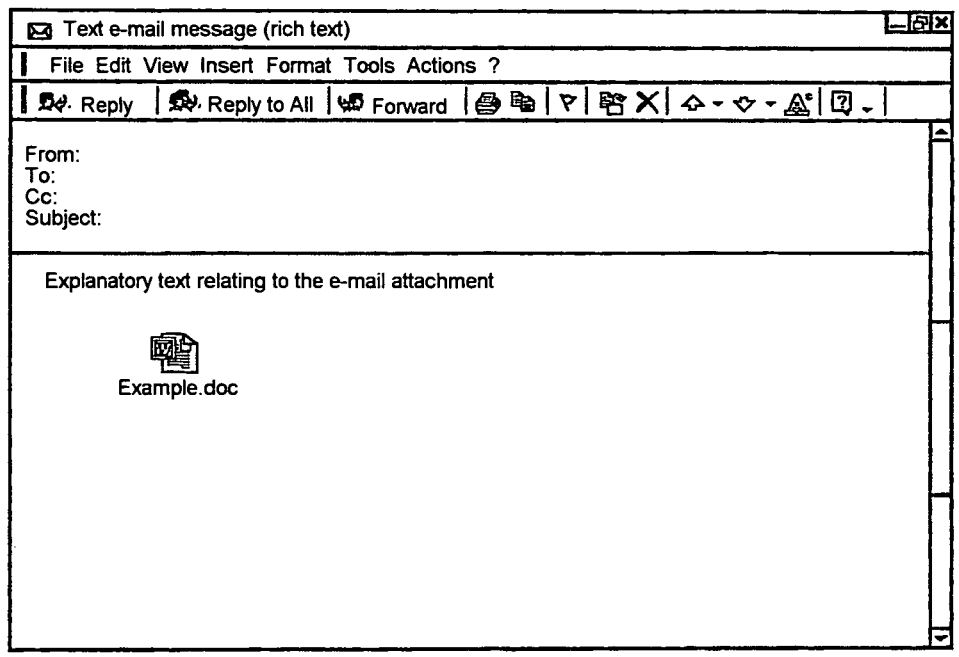
FIGS. 2A to 2D are simplified screen shots of an electronic message, to illustrate the method according to the invention.
Figure 2B:
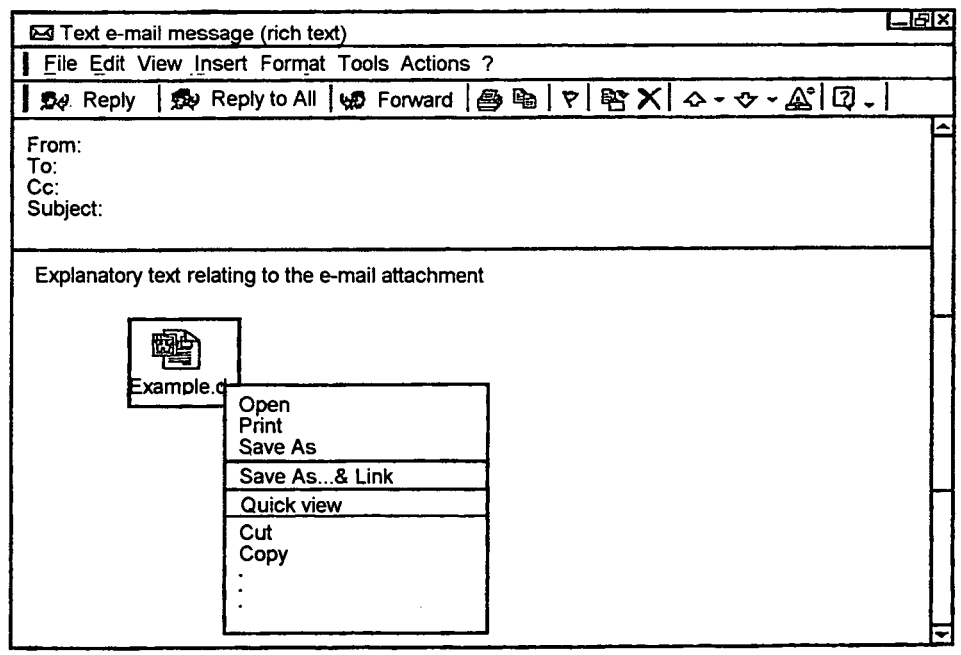

According to FIG. 2A, a user receives, for example, a "test e-mail" with explanatory text relating to an e-mail-attachment, and a file attachment with the name "Example.doc". Both the explanatory text and the file attachment are stored by the e-mail program or e-mail client in a separate backup file (e.g. *.pst file). However, there is usually a need to use, in particular, the file attachments also outside the e-mail client or application program and to file or manage them in a separate user file system.

The invention is now used in this saving process. According to FIG. 2B for example, the file attachment "Example.doc" can be highlighted by pressing or clicking the right-hand mouse button, and a window opens with the options known from Microsoft Windows™. In addition to the usual options known from the Windows operating system, such as "Open", "Print", "Save As . . . ", "QuickView", "Cut", "Copy" and so on, this window also has a further command "Save As . . . & Link". With this the highlighted file, i.e. the file attachment "Example.doc", is replaced by a memory location link to a user-selected memory location in a user file system and the electronic message is thereby modified. To be more precise, the file attachment is cut, then the file attachment is temporarily stored in a temporary memory buffer, and lastly the memory location link is inserted in the e-mail.

Figure 2C:
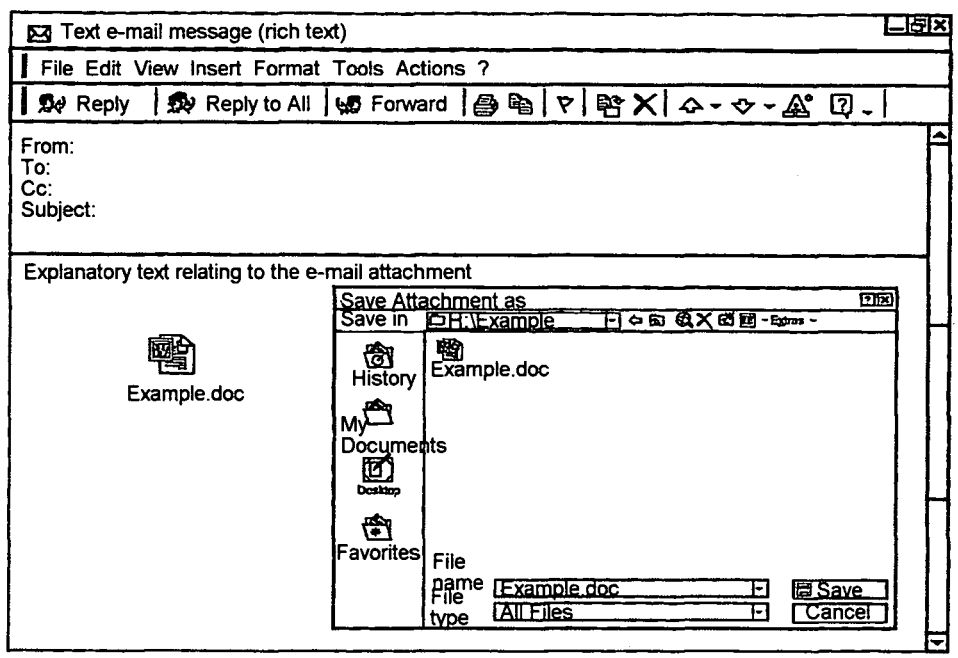

As the next step after clicking on the "Save As . . . & Link" command, FIG. 2C shows a likewise conventional Windows™ screen shot where it is now possible to select the location or rather the user file system under which the file attachment is to be stored. Here a user also has the option of amending the file name of the file attachment and of creating a specific file structure or of setting predetermined rules for saving the file attachment.

Figure 2D:
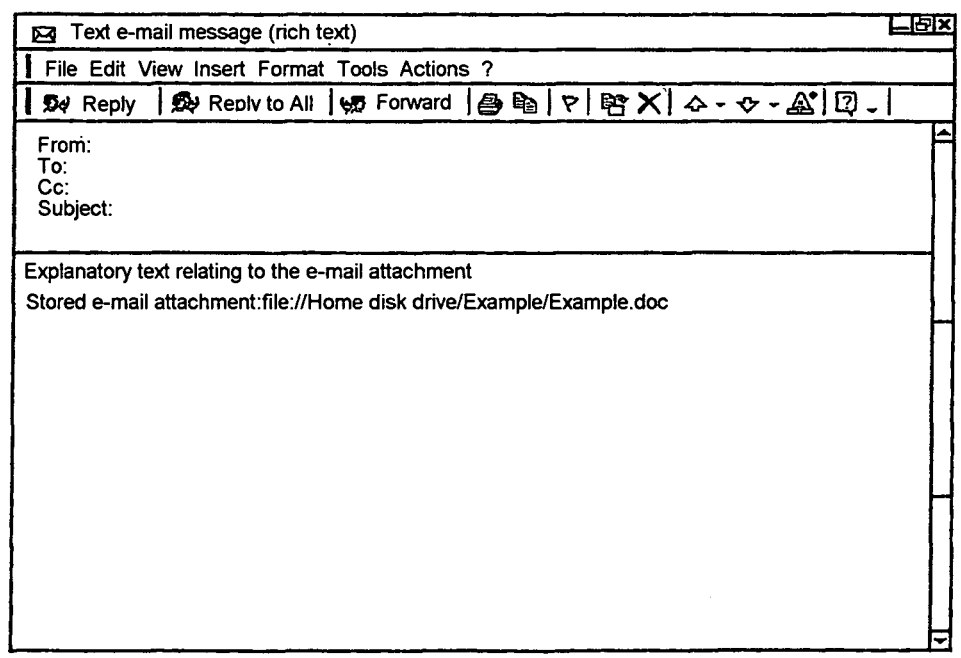

Clicking on the "Save" field in FIG. 2C causes the file attachment "Example.doc" to be replaced by a memory location link "file://Home disk drive/Example/Example.doc" as shown in FIG. 2D. When the electronic message is closed, the amendments made are stored accordingly in the e-mail client or application program and the electronic message is thereby modified.

The memory location link indicated in the electronic message has a substantially smaller memory capacity requirement (approx. 1 kilobyte) than the actual file attachment, which leads to optimization of the available memory capacity requirement. Nevertheless, no information is lost, since the electronic message still has a link to the actual file attachment. Thus, for example, double clicking on the memory location link "file://Home disk drive/Example/Example.doc" opens the required file attachment at any time.

Figure 3:
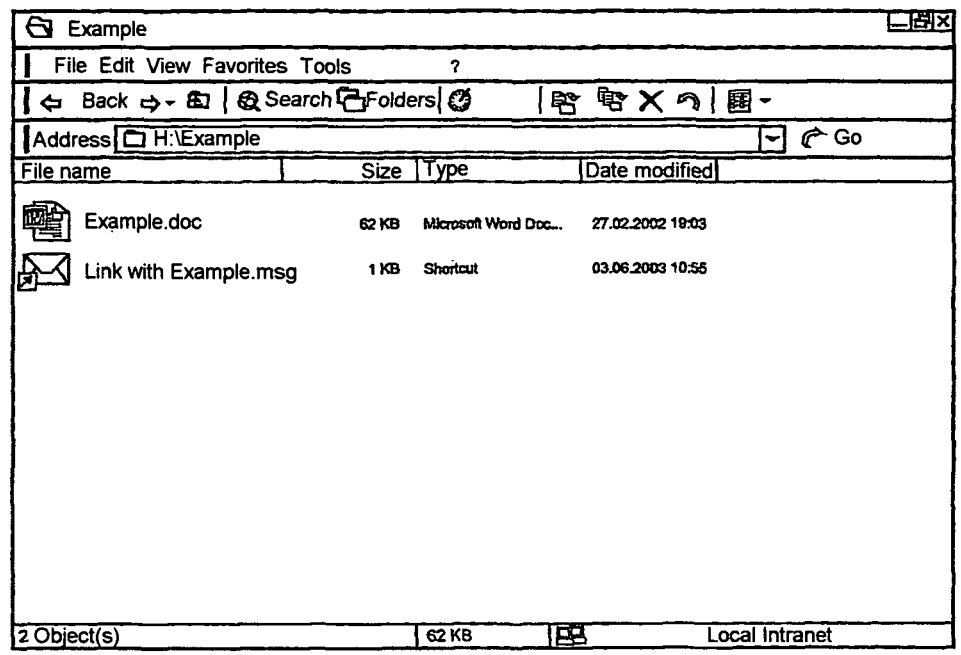
FIG. 3 is a simplified screen shot of a user file system, to illustrate the method according to the invention.

FIG. 3 shows a simplified screen shot of a user file system, to illustrate the procedures for saving a file attachment which has been replaced accordingly. Here the same reference characters again denote the same or corresponding elements and the description will not be repeated.

According to FIG. 3, a file management application program such as Microsoft Explorer™ is, for example, used to open the memory location in the user file system in which the file attachment "Example.doc" has been filed by means of the above-mentioned command "Save As . . . & Link".

The user thus has the usual options for managing the file attachment "Example.doc" transmitted by means of the electronic message.

With the method according to the invention, there is also the option not only of replacing a file attachment by a memory location link such as "file://Home disk drive/Example/Example.doc" in the electronic message but also, when the file attachment is saved, of creating a message link in the form of what is called a "backlink" to the modified electronic message at the user-selected memory location in the user file system.

To be more precise, according to FIG. 3 an additional file "Link with Example.msg" is generated in the same folder as the file attachment "Example.doc". This additional file represents a backlink to the e-mail client or messaging application program and, for example, double clicking on this backlink automatically opens the thus associated electronic message, e.g. "Test e-mail". There is thus a link not only from the electronic message to the user file system but also from the user file system back to the electronic message.

This backlink or message link preferably has the same name as the file attachment; this substantially simplifies retrieval of the original e-mail. If the file name was amended when the at least one file attachment was saved according to FIG. 2C, the amended file name of the file attachment is preferably also taken into account and used accordingly when the message link is created.

As already indicated, the procedure for saving the file attachments can also be filed in a user file system according to user-defined rules and/or in a user-defined file structure. This results not only in memory capacity optimization but also in a particularly user-friendly filing system for file attachments.

FIG. 5 is a flowchart to illustrate essential method steps of the method according to the invention for the user-based processing of electronic messages with file attachments. Here, in a step S1, for example an e-mail client or messaging application program is launched. If an electronic message has a file attachment, in a step S2 the file attachment is replaced by a memory location link to a selected memory location in the user file system, and the electronic message is modified accordingly. In a step S3, the file attachment is saved at the selected memory location in the user file system and, in an optional step S4, a backlink or message link to the modified electronic message is created at the selected memory location in the user file system. In a step S5, the method according to the invention is terminated.

Described below is an appropriate device for implementing the method described above, and this device can be particularly easily provided in any telecommunications terminal.

Figure 4:
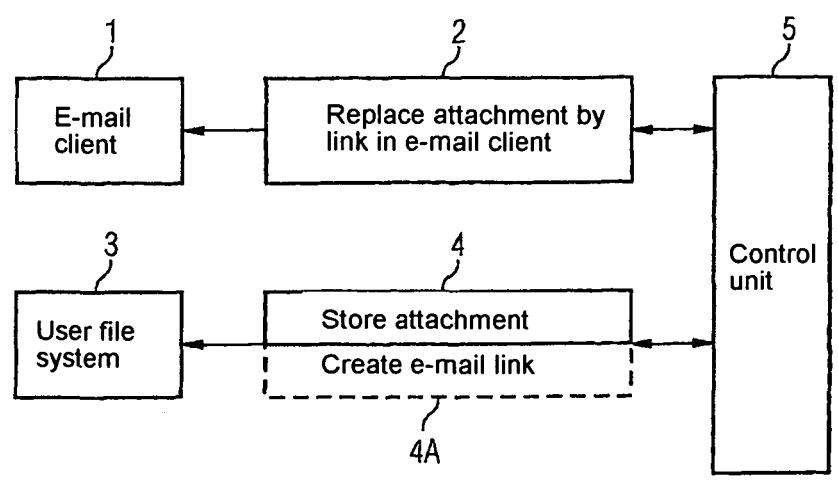
FIG. 4 is a simplified block diagram of a device according to the invention for the user-based processing of electronic messages.

FIG. 4 is a simplified block diagram of a device according to the invention for the user-based processing of electronic messages. Here reference character 1 denotes an e-mail client or messaging application program which is, for example, the Microsoft Outlook™ or Lotus Notes™ program described above. An attachment substitution unit 2 is used here to replace the file attachment of an electronic message of the e-mail client 1 by an appropriate memory location link as described above. An attachments insertion unit 4 is, furthermore, used to insert the replaced file attachment at a selected memory location in a user file system 3, which is preferably configured on the local hard disk or directly in the telecommunications terminal. However, user file systems can normally also be located in an internal or external network, provided that it is possible for only one particular user to log on to them.

According to FIG. 4, the attachments insertion unit 4 can also have a link insertion unit 4A for inserting, at the selected memory location in the user file system 3, a message link or backlink which refers back to an electronic message with a replaced file attachment. The e-mail client 1, the attachments substitution unit 2 and the attachments insertion unit 4 are controlled by a control unit 5 for coordination purposes.

Preferably what is called an "operating system" (OS) of a respective telecommunications terminal or PC is suitable for the detailed implementation of the method described above and the associated device. In particular, the use of, moreover, a Microsoft Windows environment enables the invention to be achieved with particularly simple means.

By avoiding the multiple storage of file attachments, substantial cost advantages can thus be achieved without adversely affecting ease of handling. Filed attachments can be retrieved particularly easily, especially by using the backlinks.

The invention has been described above with reference to the SMTP e-mail client "Microsoft Outlook™". It is, however, not limited thereto and similarly encompasses alternative e-mail clients or messaging application programs for sending/receiving electronic messages with file attachments which are memory capacity intensive.

The invention claimed is:

1. A method for processing an electronic message comprising:
   receiving an electronic message, the electronic message comprised of at least one file attachment;
   opening the electronic message;
   saving the at least one file attachment in a user-selected memory location via actuation of a save as and link command;
   replacing the at least one file attachment in the electronic message with at least one first link when the at least one file attachment is saved via the actuation of the save as and link command, the at least one first link configured to display the at least one file attachment after the at least one first link is actuated;
   creating a second link to the electronic message when the at least one file attachment is saved via the actuation of a save as and link command; and
   saving the second link to the electronic message in the user-selected memory location when the at least one file attachment is saved via the actuation of the save as and link command.

2. The method according to claim 1 wherein the user-selected memory location is a file and the second link is created and saved such that the second link is displayed in the file, the second link configured to display the electronic message after the second link is actuated.

3. The method according to claim 2, wherein the at least one file attachment has a file name that is changed when the at least one file attachment is saved.

4. The method according to claim 3, wherein the second link is comprised of a name that is comprised of the changed file name.

5. The method according to claim 1 wherein the electronic message is an e-mail of an SMTP e-mail client.

6. The method according to claim 1, wherein the at least one file attachment is saved according to a defined rule and/or in a set file structure.

7. The method of claim 1 wherein the at least one first link is an attachment link.

8. The method of claim 1 wherein the user-selected memory location is a hard disk of a telecommunications terminal or a memory accessible via a network.

9. The method of claim 1 wherein the second link is a backlink.

10. The method of claim 1 wherein the user-selected memory location is a file of a file system, the file system stored on and/or maintained by an electronic device selected from the group consisting of computers, telecommunications terminals and networks.

11. A device for user-based processing of at least one electronic message, the device comprising:
    an e-mail client configured to receive at least one electronic message having a file attachment;
    an attachment substitution unit configured to replace a file attachment of a received electronic message with a memory location link after user input is received that requires the file attachment to be saved and linked via actuation of a save as and link command;
    a user file system configured to store the file attachment;
    an attachment insertion unit configured to insert the replaced file attachment in a selected memory location in a file system after the user input is received that requires the file attachment to be saved and linked via actuation of the save as and link command;
    a message link insertion unit configured to insert a message link in the selected memory location when the attachment is stored in the selected memory location and the user input requires the file attachment to be saved and linked via the actuation of the save as and link command, the message link referring to the electronic message; and
    a control unit configured to control the e-mail client, the attachment substitution unit, the message link insertion unit and the attachment insertion unit.

12. The device according to claim 11 wherein the selected memory location is a file in the file system and the message link is created and saved such that the message link is displayed in that file, the message link configured to display the electronic message after the message link is actuated.

13. The device according to claim 12, wherein the message link is comprised of a file name of the inserted file attachment.

14. The device according to claim 11, wherein the attachment insertion unit is configured to automatically file the replaced file attachment using a modified file name.

15. The device according to claim 14, wherein the attachment insertion unit files the replaced file attachment according to a user-defined rule and/or a user-defined file structure.

16. The device of claim 11 wherein the message link is a backlink.

17. The device of claim 11 wherein the user-selected memory location is a file of a file system, the file system stored on and/or maintained by an electronic device selected from the group consisting of computers, telecommunications terminals and networks.

18. The device of claim 11 wherein the selected memory location is a file of a file system and the message link insertion unit is configured to insert a message link in the file such that the message link is displayed in the file along with the file attachment, the message link configured to display the electronic message after the message link is actuated.

19. The device of claim 11 wherein the message link insertion unit is comprised of a backlink generation apparatus.

20. A device for processing of at least one electronic message, the device comprising:
    an e-mail client configured to receive at least one electronic message having a file attachment;

a user file system configured to store the file attachment in a file of a file system;

an attachment substitution unit configured to replace the file attachment of the received at least one electronic message with a memory location link in that at least one electronic message when user input provides a save as and link command requiring the file attachment to be saved and linked in the file;

a display device configured to display the file attachment stored in the file of the file system after the file is accessed by a user;

a message link insertion unit configured to insert a message link in the file of the file system when the user input provides the save as and link command requiring the file attachment to be saved and linked such that the message link is displayed adjacent to the file attachment after the file is accessed by a user, the message link referring to the electronic message such that the electronic message is displayed after the message link is actuated; and a control unit configured to control the attachment substitution unit, the e-mail client and the message link insertion unit such that attachment substitution and message link insertion occurs automatically when the user input is provided to the device.

* * * * *